No. 810,869. PATENTED JAN. 23, 1906.
J. B. KING.
POWER TRANSMITTING MECHANISM.
APPLICATION FILED APR. 10, 1905.
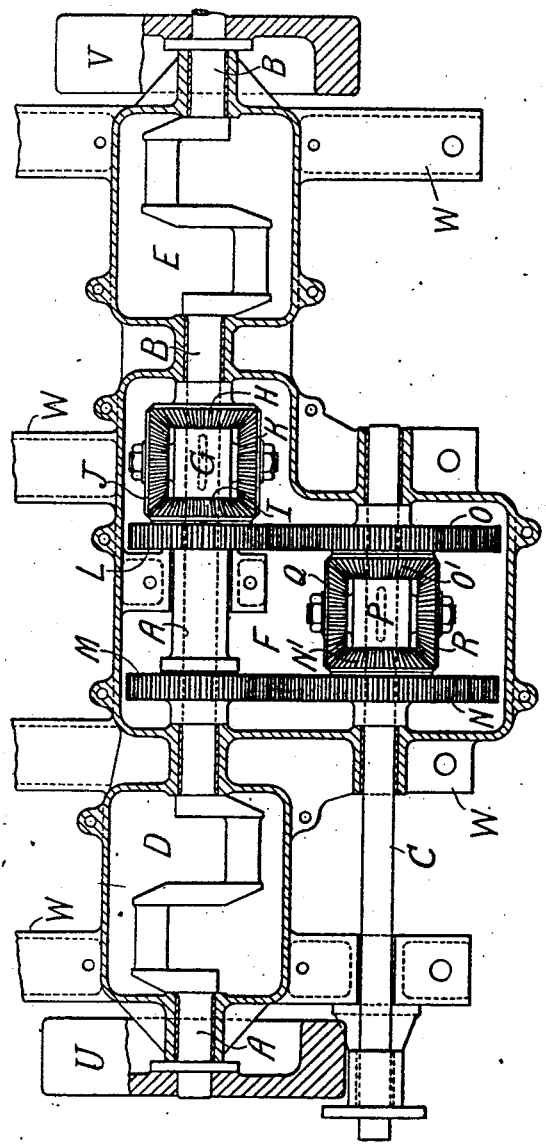
Witnesses:—
C. Heymann.
L. Waldman
Inventor:—
John Baragwanath King
by B. Singer
Attorney

UNITED STATES PATENT OFFICE.

JOHN BARAGWANATH KING, OF PLYMOUTH, ENGLAND.

POWER-TRANSMITTING MECHANISM.

No. 810,869. Specification of Letters Patent. Patented Jan. 23, 1906.

Application filed April 10, 1905. Serial No. 254,883.

*To all whom it may concern:*

Be it known that I, JOHN BARAGWANATH KING, a subject of the King of the United Kingdom of Great Britain and Ireland, residing at Plymouth, county of Devon, England, have invented certain new and useful Improvements in Power-Transmitting Mechanism, of which the following is a specification.

This invention relates to improvements in and relating to power-transmitting mechanism, more especially for automobiles and the like.

Heretofore the practice has generally been in providing for change from one speed to another to throw one set of gearing out of engagement and by means of clutch devices or the like to bring into operation another set of gearing of increased or decreased ratio, which sudden change is accompanied by excessive jar of the machinery.

Now the object of my present invention is to obviate this disadvantage and to provide for gradual change from one speed to another by operating the main shaft through differential gearing from independent engines running at different speeds, so that the variation of transmission is obtained by varying the speed of one of the engines.

To this end my invention consists, broadly, in arranging two independent engine-shafts rotating at different speeds and driving the main drive-shaft through differential gears, one set of differential gears being carried on the main drive-shaft and the other on the engine-shafting.

The invention is illustrated, by way of example, in the accompanying drawing, the figure of which is a sectional plan showing the improved gearing.

In carrying my invention into practical effect I arrange two engines side by side, with the shafts preferably in line. The said engines run normally at different speeds, and the rear engine, in order to balance the fore engine, will run at one-third of the speed of the fore engine. As shown, the rear-engine shaft A is in direct line with the fore-engine shaft B, and parallel thereto is arranged the main drive-shaft C, which may extend to the rear axle of the automobile or may itself form a part thereof.

D and E are the crank-chambers of the respective engines, and in the present instance there is shown cast in one piece therewith an intermediate chamber or gear-box F.

Fast on the rear-engine shaft is the carrier G for the differential pinions J and K, which mesh with the differential pinion I loose on the said shaft. Meshing also with the pinions J and K is the main drive-pinion H of the fore engine. Keyed or otherwise secured to the pinion I is the loose spur-wheel L. A second spur-wheel M, having the same number of teeth as the wheel L, is keyed to the rear-engine shaft, and said spur-wheels M and L mesh with spur-wheels N and O, both of the same size and carried loose on the main drive-shaft C. Fast on the shaft C is the carrier P for the differential pinions Q and R, which mesh with pinions N' and O', fixed to the spur-wheels N and O, respectively.

U and V are the fly-wheels of the fore and rear engines, and the brackets for bolting the casting to the car-framework are represented by W.

The operation of the gear is as follows: When the fore-engine shaft B rotates at three times the speed of the rear-engine shaft A— that is, at three times the speed of the carrier G—the pinions J and K roll over the pinions H and I, the pinion I rotating at the same speed as the shaft A, but in the reverse direction. The spur-wheel L, which is secured to the pinion I, is rotated in the reverse direction to the engine-shafts, and accordingly the spur-wheel O is turned in the opposite direction—that is, in the same direction as the engine-shafts—and carries therewith the pinion O', which rotates with the differential pinions Q and R. The rear-engine shaft rotates the spur-wheel M, and the loose spur-wheel N and pinion N' are accordingly rotated in the opposite direction to the engine-shaft. As the pinions N' and O' thus rotate at the same speed in opposite directions, the carrier P stands still. When the rear engine is accelerated, the increased rotation of the spur-wheel N and pinion N' causes the carrier P to rotate in the same direction as the pinion N', and therewith rotates the main drive-shaft. When the rear engine is retarded below the normal of one-third speed, the main drive-shaft is similarly rotated in the opposite direction.

In place of the spur-gearing connecting the main drive-shaft and engine-shafts chain-and-sprocket gear may be substituted.

It will thus be seen that by the above-described mechanism the speed of an automobile can be directly controlled by simple operative control of the said engines, giving an elastic connection without the intervention of rigid change-gear mechanism, as commonly adopted.

While I have herein shown and described the gear connections of the shafts as toothed gears, it will be understood that I do not wish to limit myself to toothed gears, as any form of elastic connection which could perform the function of a differential gear would come within the scope of my invention.

Having now described my invention, what I claim, and desire to secure by Letters Patent of the United States, is—

1. In combination, a pair of engine-shafts, differential gearing connecting said shafts, a drive-shaft, and differential gearing therefor operatively connected with one of said engine-shafts and with differential gearing therefor.

2. In combination, a pair of engine-shafts, differential gearing operatively connecting said shafts, a drive-shaft, and differential gearing therefor directly connected with one of said engine-shafts, and indirectly connected with the other.

3. In combination, a pair of alined engine-shafts, differential gearing operatively connecting said shafts, a drive-shaft, and differential gearing therefor directly connected with one of said engine-shafts and also with the differential gearing therefor.

In testimony whereof I have signed my name to this specification in the presence of two subscribing witnesses.

JOHN BARAGWANATH KING.

Witnesses:
WALLACE FAIRWEATHER,
JNO. ARMSTRONG, Junr.